(12) United States Patent
Johnson

(10) Patent No.: US 9,796,329 B1
(45) Date of Patent: Oct. 24, 2017

(54) EXCAVATOR SAFETY SYSTEM AND METHOD

(71) Applicant: Alan L. Johnson, Barrington, IL (US)

(72) Inventor: Alan L. Johnson, Barrington, IL (US)

( * ) Notice: Subject to any disclaimer, the term of this patent is extended or adjusted under 35 U.S.C. 154(b) by 43 days.

(21) Appl. No.: 15/232,403

(22) Filed: Aug. 9, 2016

Related U.S. Application Data

(60) Provisional application No. 62/336,324, filed on May 13, 2016.

(51) Int. Cl.
*B60Q 9/00* (2006.01)
(52) U.S. Cl.
CPC .................... *B60Q 9/008* (2013.01)
(58) Field of Classification Search
CPC ...................................... B60Q 9/008
See application file for complete search history.

(56) References Cited

U.S. PATENT DOCUMENTS

2015/0042492 A1* 2/2015 Heacock ............. G08G 1/0955
340/907

* cited by examiner

*Primary Examiner* — Curtis Odom
(74) *Attorney, Agent, or Firm* — Clifford H. Kraft

(57) ABSTRACT

A safety light system on an excavator or parked vehicle that is manually operated by the excavator operator. The unit is typically controlled by a single button located in the excavator cab. The excavator operator presses the button. A green LED, or other green light, projects a green beam of light toward the rear of the truck. This signals the truck driver that he can begin backing toward the excavator. At a predetermined distance, the excavator operator again pushes the button. The unit switches to an orange light. Finally, in a final position, the excavator operator again presses the button to project a red light. As the truck driver backs toward the excavator, he first sees green, then orange and finally red. Upon seeing red, he knows to stop backing. A fourth push can again project a green light signaling a safe condition for drive-away.

20 Claims, 4 Drawing Sheets

EXCAVATOR SAFETY SYSTEM AND METHOD

This application is related to and claims priority to U.S. Provisional Patent application No. 62/336,324 filed May 13, 2016. Application 62/336,324 is hereby incorporated by reference in its entirety.

BACKGROUND

Field of the Invention

The present invention relates generally to the field of safety and more particularly to a safety system and method for excavator and loader vehicles.

Statement of the Problem

During the process of excavation, excavator and loader vehicles are typically utilized. The dirt removed must be loaded into trucks. In general, the truck backs up into position near the excavator or loader to be loaded. This backup process is very dangerous, especially at night and/or in bad weather. The truck driver must use mirrors to backup, and the excavator or loader vehicle is very hard to see. The excavator may or may not have a functioning horn, and the truck driver may have his window closed. Sometimes, a human is used to signal the truck driver; however, at night and bad weather, the driver may not always be able to see or hear the human. Numerous backup accidents have been recorded where the truck backs into the excavator in some cases injuring or killing the excavator operator.

SUMMARY OF THE INVENTION

The present invention is a green-orange-red or green-red safety light attached to an excavator or other parked vehicle that is manually operated by the excavator operator. In an alternate embodiment, the light is automatically operated. The unit is typically controlled by a single button mounted or otherwise located in the excavator cab. To start the process, the excavator operator presses the button. A green LED, or other green light, projects a green beam of light toward the rear of the truck. This signals the truck driver that he can begin backing toward the excavator. At a predetermined distance, the excavator operator again pushes the button. The unit switches to an orange light. Finally, in a final position, the excavator operator again presses the button to project a red light. As the truck driver backs toward the excavator, he first sees green, then orange and finally red. Upon seeing red, he knows to stop backing and ends up in exactly the correct position a safe distance from the excavator or loader vehicle. An optional fourth push can again project green telling the truck driver to drive away. In an alternate embodiment, the light changes automatically from green to orange to red using a distance sensor such as light, RF or sonic. A proximity safety sensor can also be used to project red if the truck gets too close.

DESCRIPTION OF THE FIGURES

Attention is now directed to several figures that illustrate features of the present invention.

Several illustrations and drawings have been presented to aid in understanding the present invention. The scope of the present invention is not limited to what is shown in the figures.

DESCRIPTION OF THE PREFERRED EMBODIMENTS

The present invention relates to a safety system for excavator and loader vehicles that includes a light display, typically LED, attached to the excavator or loader vehicle. A button (or multiple buttons) is located in the cab so that the operator can manually change the color being projected by simply hitting the button when needed.

Figure 1:
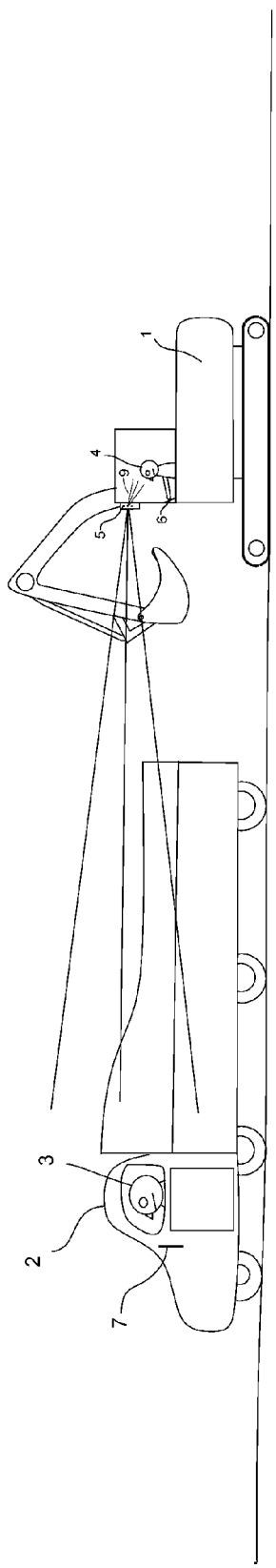
FIG. 1 shows the backing process with the light display mounted on an excavator.

FIG. 1 shows and excavator vehicle 1 and a truck 2 ready to back toward the excavator. The truck driver 3 looks in his mirror 7 and waits to see a green light. A light display 5 is attached to the excavator 1 and controlled by the excavator operator 4 using one or more buttons 6 mounted in the cab (a single button is the preferred embodiment). To start the backup, the operator hits the button 6, and the light display 5 shows green. The truck starts backing. At a predetermined distance, the operator again hits the button 6. The light display 5 changes to orange. Finally, when the truck reaches the loading position, the operator hits the button 6 again, and the light display 5 changes to red. A final hit of the button 6 can optionally cause the light display 5 to go back to green when the process is complete and the truck can leave. Also, the lights can be made to blink or flash at various points in the cycle. A preferred mode is to flash the green when starting, then steady green, then steady orange, then steady red, and finally to flash the green again followed by steady green to signal okay for the truck driver to drive away.

Optional pilot lights 9, or any other indicator, can be installed on the side of the device or in the cab, or anywhere else, so that the operator can determine what light is actually on.

In an alternate embodiment, a sensor can sense the distance (and optionally the speed of the truck) and operate the light display 5 automatically based on distance or distance and speed. A typical sensor can be ultra-sonic, infrared, Laser, RF, Radar or any other type of sensor that can measure at least distance between two points. A preferred sensor is a laser that reflects light from the truck back to a receiver.

A proximity or distance sensor can also be used in conjunction with the operator-controlled manual button or buttons as an extra safety device. In this case, the light display 5 will switch to project red whenever the truck is within a predetermined distance of the excavator regardless of the button sequence or of what color was previously being projected. This proximity sensor can plug into the control unit, or can communicate with it wirelessly.

The light display 5 can be hardwired to the button 6 and a control unit, or the link to the button can be wireless. Any wireless technique can be used including BLUETOOTH, Zigbee, WiFi or the cellular telephone network.

Figure 2:
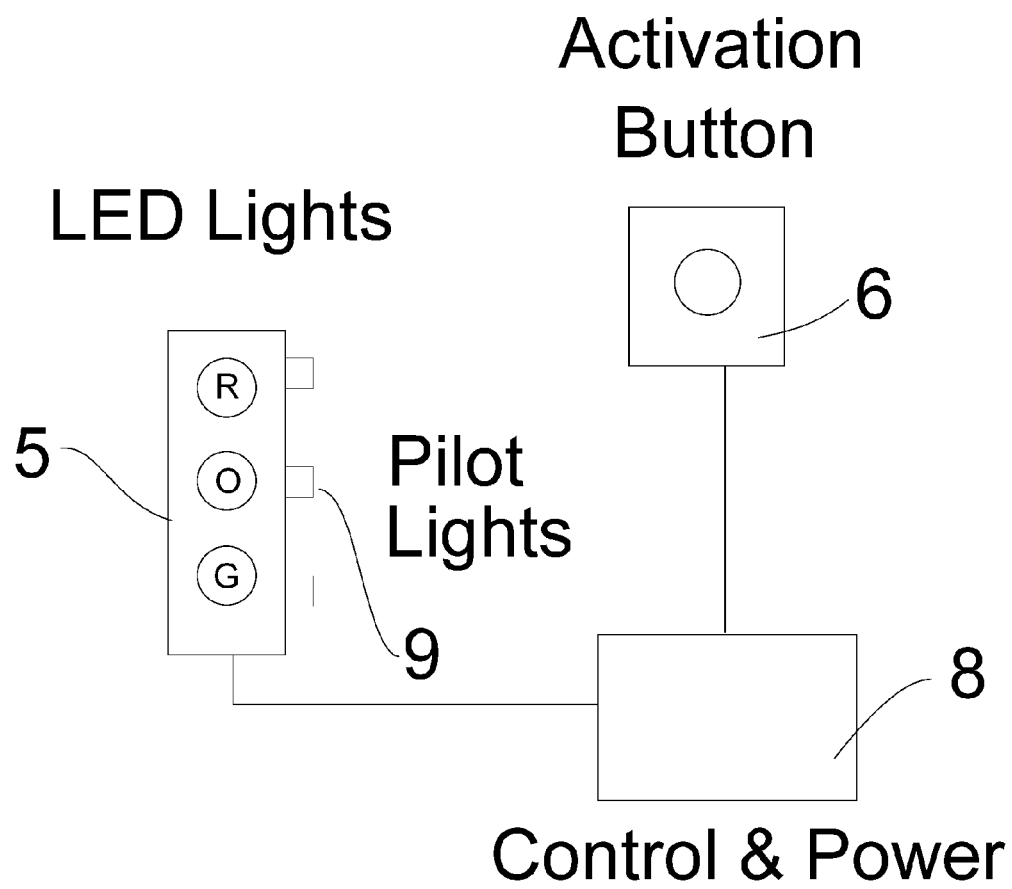
FIG. 2 shows the three major components of the system.

FIG. 2 shows a diagram of the major components of the system of the present invention—LED or other lights 5, an activation button 6 and a controller and power supply 8. FIG. 2 also shows the optional pilot lights 9. While the preferred embodiment has a single control button, alternate embodiments can have one, two, three or more buttons. A particular embodiment has a button for each color. Typically, in this embodiment, hitting a new color extinguishes the old color.

For example, if the display 5 is showing green, and the red button is hit, the display 5 changes to red, extinguishing green.

While three discrete LEDs are shown in the drawings, it is possible to use a single LED that has the ability to change colors.

In a particular embodiment of the present invention, the button 6 can be a handheld unit that operates wirelessly outside the cab. This is useful when the operator must be out of the cab during the backup. In one embodiment, the lights can be controlled by an application (app) on a smartphone.

In all embodiments of the invention, there is typically a button push or an abort button that forces the light display to show red. This is useful in emergency and unexpected situations where it is imperative to stop the truck. In the one button embodiment, multiple rapid button pushes can be used to optionally force red.

Figure 3:
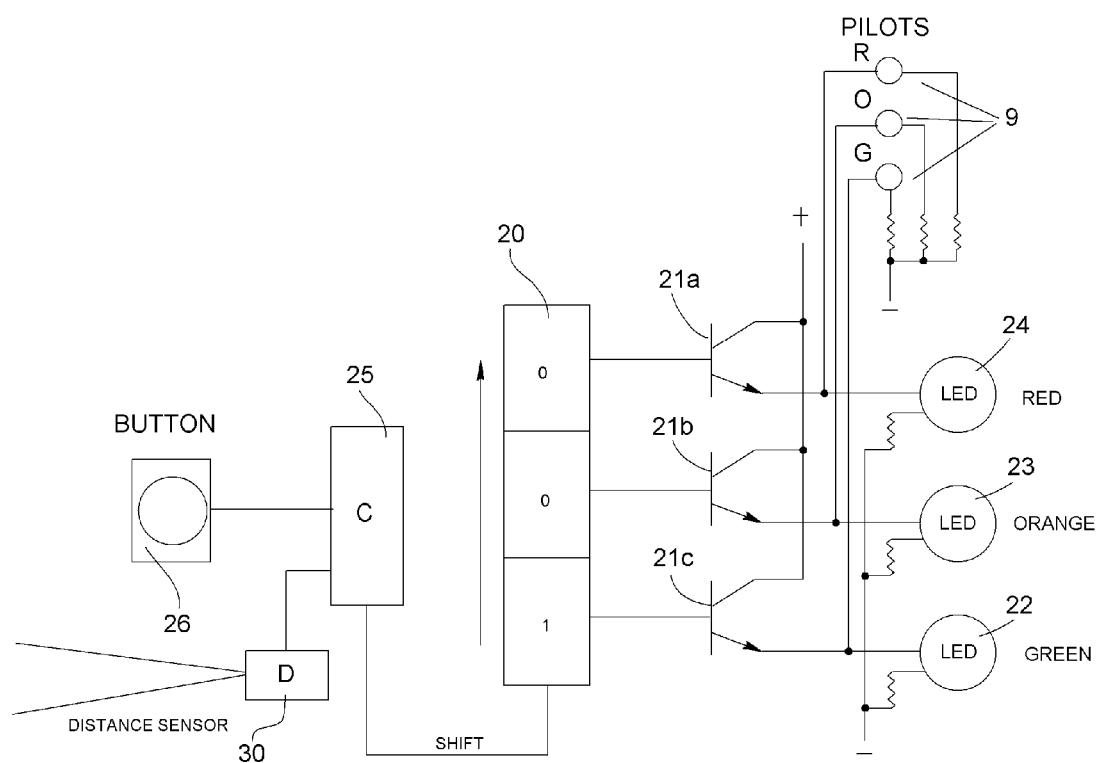
FIG. 3 shows a schematic diagram of an embodiment of the present invention.

FIG. 3 shows a schematic diagram of one way of implementing the system of the present invention. A controller 25 controls a shift register or ring counter 20. As the button 26 is sequentially pushed, a control bit moves down the register or counter activating in turn the driver transistors (or relays) 21a, 21b and 21c. If relays are used, typically driver transistors drive the relays which in turn drive the LEDs 22, 23 and 24. In some embodiments, a stepping relay can be used instead of a shift register. Because the environment is tough, the unit and associated circuitry must be rugged, and because safety is concerned, the system must also be very reliable. For safety, the system should always fail to red (unless it loses power). In the case of power loss, the system can be run from batteries to show red. In some embodiments, the system is simply powered from the vehicle's battery. Hence, the optimum design power voltage is 12 volts. Resistors shown in FIG. 3 limit LED current to prevent burn out. The optional pilot lights 9 are also shown in FIG. 3.

The circuit shown in FIG. 3 is for example only, the circuit can use relays, transistors, FETs, can contain a processor that executes stored instructions or can by totally digital or analog or hybrid between digital and analog as shown. Any circuit that performs the control function is within the scope of the present invention.

FIG. 3 also shows a distance measuring sensor 30 attached to the controller 25. This device allows the controller in some embodiments to automatically switch the state of the lights based on distance. This sensor 30 can optionally include a rate-of-closure sensor (speed). If a loader or other vehicle is approaching too fast, the controller 25 can switch the state of the lights to red or flashing red. An optional audio horn or other sound source such as a siren, can be made to sound in such a case.

Figure 4:
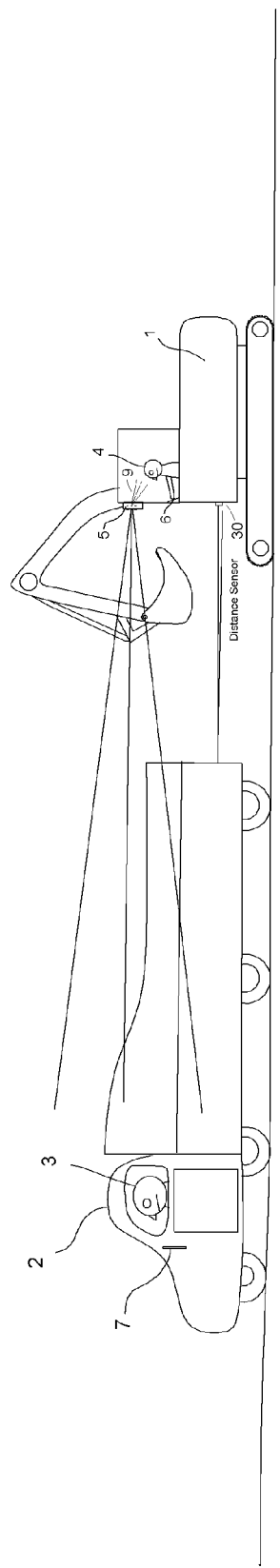
FIG. 4 shows the embodiment of FIG. 1 with a distance measuring sensor.

FIG. 4 shows the embodiment of FIG. 1 with a distance measuring sensor 30 attached to the excavator 1 body.

In a particular embodiment of the present invention, the lights can be controlled by an application (App) executing on a handheld electronic device like a smartphone or tablet computer. In this case, the handheld electronic device communicates wirelessly with the controller or light display panel to set or change the state of the lights.

Various embodiments of the invention can be permanently installed in vehicles such as excavators, or any other vehicle, while other embodiments may be temporarily installed and moved from vehicle to vehicle. A removable magnetic mount or any other mount or attachment means may be used. As previously stated, connections between control buttons, the controller and the light panel can be wired or wireless. One embodiment has the control unit contained in the same housing as the light display panel with the cab button connected wirelessly. In other embodiments, the control unit may be separate from the light display panel. Any wireless technique can be used including BLUETOOTH, Zigbee and WiFi or any other wireless network or technique including cellular telephone.

The system can be run on any voltage, or from any power supply including AC mains with 12 volts DC being preferred. A power converter can be used for other voltages. Some embodiments can be run from a cigarette lighter port.

Finally, as previously stated, embodiments of the invention can be made to flash or blink, and various codes can be used. For example, the initial green may flash several times or flash at a predetermined rate for a predetermined time interval to get the driver's attention. A preferred predetermined time interval is 1-3 seconds. Other colors may be optionally be steady or flashing. The final green can again flash to signal the loading is complete.

In an embodiment of the invention, there can be a first and second predetermined time intervals with different flash rates. For example, the green light can made to flash quickly (on and off only for several tenths of a second) during the first predetermined time interval and flash at a slower rate (around ½ second on and ½ second off) during the second predetermined time interval. In this embodiment, for example, when the button is pushed the first time, the green light can flash very quickly several times and the flash more slowly, and finally go steady. The same behavior can be repeated when the button is pushed the fourth time. In other embodiments, any of the colors can be made to flash in a similar manner.

An alternate embodiment of the invention only uses two lights red and green. This version is useful when the intermediate orange safety range is not needed.

While excavators and loaders have been named in this disclosure, the present invention can be used with any vehicle or stationary object to prevent a backup accident. Any situation where a vehicle is backing upon another vehicle or stationary object is within the scope of the present invention.

Several descriptions and illustrations have been provided to aid in understanding the present invention. One with skill in the art will realize that numerous changes and variations may be made without departing from the spirit of the invention. Each of these changes and variations are within the scope of the present invention.

I claim:

1. A method to prevent backup collisions between excavators and loaders comprising:
    attaching a light display panel to an excavator visible in front of the excavator by a loader driver backing up toward the excavator, the light display panel having green, orange and red projecting lights;
    mounting a control button in the excavator cab;
    connecting the control button to the light display panel with wire or wirelessly, wherein the control button controls the light display panel;
    enabling the control button so that pushing it once causes the light display panel to project a green light beam; pushing it a second time causes the light display panel to project an orange light beam; and pushing it a third time causes the light display panel to project a red light beam;
    providing an indicator inside the excavator cab that indicates which light on the light display panel is lit.

2. The method of claim 1 further comprising enabling the control button so that pushing it a fourth time causes the light display panel to again project a green light beam.

3. The method of claim 1 wherein said light display panel is removably attached to the excavator with a magnet.

4. The method of claim 1 further comprising mounting three buttons in the cab of the excavator, one for green, one for orange and one for red.

5. The method of claim 1 wherein pushing the control button rapidly several times causes the light display to project a steady red light beam or flashing red beam.

6. The method of claim 1 further comprising mounting a distance measuring sensor near the light display on the excavator, the distance measuring sensor determining predetermined distances to switch the light display from green to orange or from orange to red.

7. The method of claim 1 further comprising causing the light display panel to first flash green and then project steady green when the button is pushed a first time.

8. The method of claim 1 further comprising causing the light display panel to first flash green and then project steady green when the button is pushed a fourth time.

9. A method for preventing backup collisions between excavators and loaders comprising:
   providing a light display panel attachable to an excavator visible in front of the excavator by a loader backing toward the excavator, the light display panel having at least green, orange and red projecting lights;
   providing a control button mountable in the excavator cab; wherein the control button is connected to the light display panel with wire or wirelessly, wherein the control button controls the light display panel;
   enabling the control button so that pushing it once causes the light display panel to first blink green for a first predetermined time interval and then project a steady green light beam; pushing it a second time causes the light display panel to project a steady orange light beam; pushing it a third time causes the light display panel to project a steady red light beam, and pushing it a fourth time causes the light display panel to blink green for a second predetermined time interval and then to project a steady green light beam;
   providing green, orange and red pilot lights visible inside the excavator cab that mimic the lights on the light display panel, such that whenever a particular colored light on the light display panel is lit, a correspondingly colored pilot light is lit.

10. The method of claim 9 wherein the first and second predetermined time intervals are equal.

11. The method of claim 10 wherein the first and second predetermined time intervals are between 1 and 3 seconds.

12. A method of providing protection for a parked vehicle wherein a second vehicle is backing toward the parked vehicle comprising:
   attaching a light display panel to the parked vehicle visible in front of the parked vehicle by a driver backing up the second vehicle toward the parked vehicle, the light display panel having at least green and red projecting lights;
   mounting a control button in the parked vehicle's cab;
   connecting the control button to the light display panel with wire or wirelessly, wherein the control button controls the light display panel;
   enabling the control button so that pushing it once causes the light display panel to project a green light beam, and pushing it a subsequent time causes the light display panel to project a red light beam;
   providing an indicator inside the parked vehicle's cab that indicate which light on the light display panel is lit.

13. The method of claim 11 further comprising an orange projecting light.

14. The method of claim 13 further comprising enabling the control button so that pushing it a first time causes the light panel to project a green light beam; pushing it a second time causes the light panel to project an orange beam and pushing it a third time causes the light panel to project a red beam.

15. The method of claim 14 wherein pressing the control button a fourth time causes the light display panel to again project a green light beam.

16. The method of claim 13 further comprising mounting three buttons in the cab of the parked vehicle, one for green, one for orange and one for red.

17. The method of claim 12 wherein pushing the control button rapidly several times causes the light display to project a red light beam.

18. The method of claim 13 further comprising mounting a distance measuring sensor near the light display on the parked vehicle, the distance measuring sensor determining predetermined distances to switch the light display from green to orange or from orange to red.

19. The method of claim 12 further comprising causing the light display panel to first blink green and then project steady green when the button is pushed a first time.

20. The method of claim 15 further comprising causing the light display panel to first blink green and then project steady green when the button is pushed a fourth time.

* * * * *